United States Patent

[11] 3,633,193

[72] Inventor August Milo
1015 Schliefer Drive, Hillside, N.J. 07205
[21] Appl. No. 39,008
[22] Filed May 20, 1970
[45] Patented Jan. 4, 1972

[54] WARNING SYSTEM FOR PREVENTING OVERFILL IN UNDERGROUND TANKS HAVING A GAGE BOX
1 Claim, 3 Drawing Figs.
[52] U.S. Cl. .................................................. 340/244 A,
340/245, 200/84, 73/224, 73/309, 73/313
[51] Int. Cl. ........................................................ G01f 23/10
[50] Field of Search .......................................... 340/244,
244 A, 245; 73/308, 221, 224, 290, 305, 306, 307,
313, 315; 200/61.2, 84 R, 84 A, 84 C

[56] References Cited
UNITED STATES PATENTS
3,548,659 12/1970 Ellis .............................. 340/244 X
3,484,774 12/1969 Borgnakke ................... 340/244 X
3,389,603 6/1968 Jacobs ........................... 340/244 A

*Primary Examiner*—John W. Caldwell
*Assistant Examiner*—William M. Wannisky
*Attorney*—Peter J. Gaylor ABSTRACT: A warning system for preventing overfill of liquid in an underground tank provided with a gage box having connecting means at ground level, comprises a hollow housing for holding an electrical battery and having a bottom opening and bottom connecting means connectable with the gage box. A length of pipe extending from the housing, to which it is connected at its top, through the gage box and having its bottom terminating in the upper portion of the tank, has a hollow, open-bottom retainer connected to its bottom. In the retainer is mounted a float switch which will close an electrical circuit when the liquid level in the tank rises to the dangerous level. Wires from the switch pass through the pipe and housing and are connected to the battery and a signal assembly mounted on a cover attached to the housing.

INVENTOR
AUGUST MILO
BY
ATTORNEY

3,633,193

WARNING SYSTEM FOR PREVENTING OVERFILL IN UNDERGROUND TANKS HAVING A GAGE BOX

BACKGROUND OF THE INVENTION

When filling underground tanks with flammable liquid, such as gasoline, the liquid passes into the tank from the truck at high speed, and there is always danger of overfilling the tank. In such case, the liquid squirts at high speed through the vent pipe which is generally alongside the building. Obviously, there is always the danger of accidental ignition of such spillage.

SUMMARY OF THE INVENTION

Most underground gasoline tanks have a gage box (about 2 inches in diameter) used for inserting therein a gage stick for checking the level of the tank. According to the present invention, a hollow housing, designed to hold a battery, is attached to the top of the gage box. The housing has a bottom opening at which is attached the top of a pipe which passes through the gage box and extends into the upper portion of the tank. To the bottom of this pipe is attached a hollow, open-bottom retainer in which is mounted a liquid level float switch. This switch is connected by wires which pass through the pipe and housing. The latter is provided with a cover on which is mounted a signalling means, such as an electric bell. The wires are connectable to the battery and the bell to signal when the liquid level in the tank actuates the switch.

The present system provides a ready protection against overfill without requiring any changes in the tank itself or other equipment, and it can be installed in existing installations.

BRIEF DESCRIPTION OF THE DRAWINGS

The invention will be more readily understood by reference to the accompanying drawings in which a preferred embodiment is described, and in which.

The same numerals refer to the same or similar parts in the various figures.

DESCRIPTION OF THE PREFERRED EMBODIMENTS

Figures 1, 2, 3:
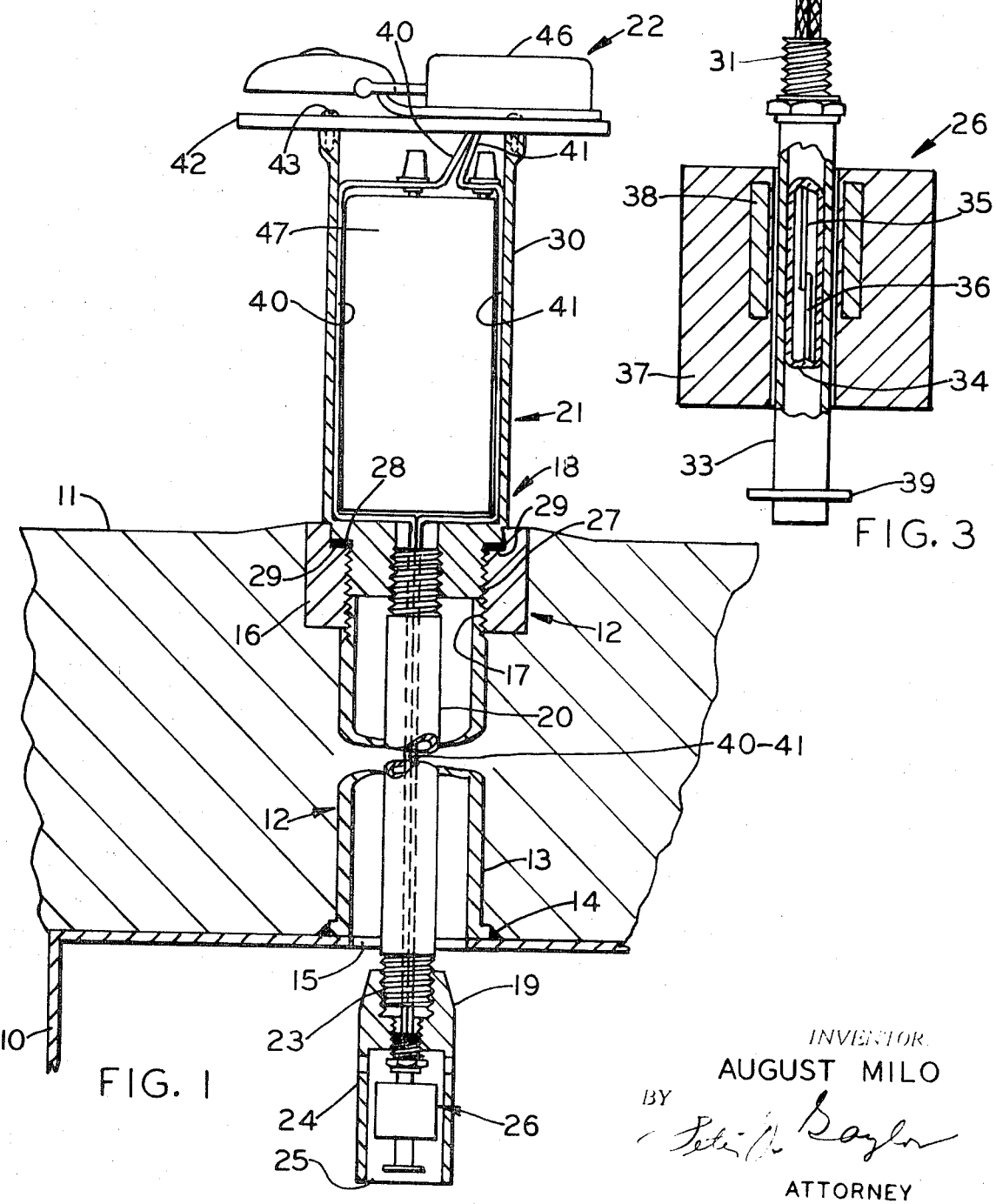
FIG. 1 depicts a side elevational view, partly in cross section of the system of the present invention as connected to an underground tank, part of which is shown.
FIG. 2 illustrates a top view of the system shown in FIG. 1.
FIG. 3 presents an enlarged cross-sectional side view of the liquid level float switch used in the invention.

Referring again to the drawings, reference number 10 denotes and underground storage tank for inflammable material, such as gasoline. Usually such tanks are buried with their tops at least 2 feet below the surface 11 of the earth. Such tanks are generally provided with a gage box, indicated generally as 12, and consisting of, say a 2-inch pipe length 13 attached to tank 10 at 14, over opening 15 in the tank. The pipe terminates at its upper end near the earth surface 11 with a screwed-on fill box 16 having interior threads 17.

The system of the present invention is indicated generally as 18, and it is screwed onto threads 17 of the gage box. System 18 consists of a float switch assembly, indicated generally as 19, a wire-carrying pipe 20, a battery section 21, and a warning system 22, energizable by the battery section.

Float switch assembly 19 is attached to the lower end of pipe 20 at screw connection 23. It consists of a hollow retainer 24 having an open end 25 through which is screwed in the float switch, indicated generally as 26. The latter is a conventional liquid level switch known as a "Reed" switch, and, as is apparent from the enlarged section thereof in FIG. 3, it consists of a nonmagnetic stem 33 attached to a fitting 31. Inside of stem 33 is a sealed glass container 34 having two magnetic contact strips 35 and 36. A gasoline-resistant float 37 surrounds stem 33, and it carries permanent magnet 38. Retainer 39 serves as a bottom stop for float 37. From FIG. 3, it will be seen that when the float 37 is up, as in FIG. 3, the magnet 38 keeps magnetic contacts 35–36 together to close the electrical circuit which leads from contacts 35–36, and through leads 40–41, which are connected separately to contact strips 35–36.

Pipe 20 may be of ½-inch size, for example, and it serves to house wires 40–41 therein.

Battery section 21 has its housing 30 connected at its hollow lower threaded end to threaded connection 27. A leather gasket 28 at shoulder 29 serves to make the connection leakproof. The body portion 30 of the battery housing is hollow so as to accommodate dry cell battery 47. There is adequate room left between battery 31 and the inner wall of body 30 to permit passage therethrough of insulated wires 40–41 from switch 26.

Leads 40–41 are connected to a conventional bell assembly 22 which consists of a base 42 attached to the cover 42 of body 30, by screws 43. On base 42 are mounted the bell 44, hammer 45, and armature and connections (not shown) disposed in housing 46.

When the flammable fluid (gasoline) is fed into the tank 10, the level in the tank rises, and when the level enters hollow end 25 of retainer 24, float 37 begins to be raised. When magnet 38 floats into position opposite contacts 35–36, the latter are closed, and electric energy from battery 47 is transferred along wires 40–41 to ring bell 44. This is the signal to stop the flow of the fluid into the tank.

When in use, the tank truck, or other vehicle delivering the flammable material, begins to fill tank 10 through an inlet (not shown). When the level of the fluid, such as gasoline, reaches float switch 26, float 37 rises and when magnet 38 closes switch 35–36, the electrical circuit is completed and current passes through wires 40–41 encased in pipe 20, and to bell assembly 22, causing bell 44 to ring, which is the signal to stop the flow of gasoline into tank 10, thus preventing overfilling and spillage.

Although an electrical bell has been shown here as the signalling means, it is to be understood that other signalling means, such as a light, may be substituted therefor. Another conventional means is a switch for shutting off the flow by closing a valve or by shutting off the power used for driving the pump, etc.

I claim:

1. A warning system for preventing overfill of liquid in an underground tank provided with a gage box having connecting means at ground level, comprising:
    a hollow housing designed to hold an electrical battery and having a bottom opening and bottom connecting means connectable in leakproof relationship with the gage box connecting means,
    a length of pipe extending from about ground level through said gage box and into the top portion of said tank and having top and bottom connecting means, and being connected at its top to the bottom opening of said housing, and serving as a conduit for electrical wiring,
    a retainer connected at its top to the bottom of said pipe and having an open hollow bottom with a passage into said pipe,
    a float switch disposed within the hollow bottom of said retainer, and having movement-limiting means for restricting movement of the float to within said retainer, and serving to make electrical contact when the liquid level in said tank rises to a predetermined height,
    a cover, disposed over and attached to said housing,
    a signal assembly disposed on and attached to said cover, and
    wiring means leading from said switch, through said pipe and said housing and connectable to said battery and said signalling means for actuation of the latter when said float switch becomes closed by rise of fluid level in said tank.

* * * * *